United States Patent
Kamitani et al.

(10) Patent No.: US 12,325,255 B2
(45) Date of Patent: Jun. 10, 2025

(54) WRITING INSTRUMENT

(71) Applicant: MITSUBISHI PENCIL COMPANY, LIMITED, Tokyo (JP)

(72) Inventors: Toshimi Kamitani, Tokyo (JP); Chihiro Mochizuki, Tokyo (JP); Wataru Sagawa, Tokyo (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 0 days.

(21) Appl. No.: 18/718,309

(22) PCT Filed: Dec. 14, 2022

(86) PCT No.: PCT/JP2022/046006
§ 371 (c)(1),
(2) Date: Jun. 10, 2024

(87) PCT Pub. No.: WO2023/112955
PCT Pub. Date: Jun. 22, 2023

(65) Prior Publication Data
US 2025/0042194 A1 Feb. 6, 2025

(30) Foreign Application Priority Data

Dec. 17, 2021 (JP) .................................. 2021-205416
Oct. 27, 2022 (JP) .................................. 2022-172667

(51) Int. Cl.
*B43K 1/12* (2006.01)
*B43K 23/08* (2006.01)
(Continued)

(52) U.S. Cl.
CPC ............... *B43K 1/12* (2013.01); *B43K 23/08* (2013.01); *B43K 23/12* (2013.01); *C09D 11/16* (2013.01)

(58) Field of Classification Search
CPC . B43K 23/12; B43K 5/02; B43K 7/08; B43K 1/003; B43K 1/006; B43K 1/12;
(Continued)

(56) References Cited

U.S. PATENT DOCUMENTS

| 5,929,135 A * | 7/1999 | Wasai ..................... C09D 11/18 |
| | | 524/832 |
| 2022/0324250 A1 | 10/2022 | Izawa et al. |
| 2023/0287227 A1* | 9/2023 | Concedieu ............. C09D 11/50 |

FOREIGN PATENT DOCUMENTS

| JP | 61-40551 Y2 | 11/1986 |
| JP | 2016-215580 A | 12/2016 |

(Continued)

OTHER PUBLICATIONS

International Search report issued Jan. 24, 2023 in PCT/JP2022/046006, filed on Dec. 14, 2022, 2 pages.

*Primary Examiner* — David J Walczak
(74) *Attorney, Agent, or Firm* — Oblon, McClelland, Maier & Neustadt, L.L.P.

(57) ABSTRACT

A writing instrument in which condensation does not occur in a cap even though the writing instrument is equipped with the cap and which has high writing instrument quality and commercial value. The writing instrument includes at least a barrel in which an aqueous ink is contained; a pen tip provided on a tip side of the barrel and capable of discharging the aqueous ink; and a cap that is removably attached on a pen tip side of the barrel, wherein the aqueous ink has a vapor pressure of 10.3 to 12.3 kPa at 50° C.

5 Claims, 6 Drawing Sheets

(51) Int. Cl.
*B43K 23/12* (2006.01)
*C09D 11/16* (2014.01)

(58) Field of Classification Search
CPC ........ B43K 23/08; C09D 11/16; C09D 11/17; C09D 11/18; C09D 11/20
USPC .............................. 401/192, 202, 213, 243
See application file for complete search history.

(56) References Cited

FOREIGN PATENT DOCUMENTS

| | | |
|---|---|---|
| JP | 2019-206151 A | 12/2019 |
| JP | 2020-049672 A | 4/2020 |
| JP | 2021-28163 A | 2/2021 |

\* cited by examiner

WRITING INSTRUMENT

TECHNICAL FIELD

The present specification relates to a writing instrument that is equipped with a cap, and relates to a writing instrument in which condensation does not occur in a cap.

BACKGROUND ART

In recent years in the related art, there have been known some marking pen-type writing instruments in which a cap formed of a material having transparency and having a large internal volume is used to show the pen tip. This type of writing instrument may cause a problem of accumulating condensed liquid in the cap in an environment with a temperature change or a temperature gradient and impairing the appearance.

This problem is intrinsic to a writing instrument having a pen tip with a large writing portion and including a transparent cap.

In the related art, in order to prevent condensation in the cap, it has been common to reduce the internal volume of the cap and use an opaque material (to make inconspicuous). However, it is currently difficult to form a cap from an opaque material in a writing instrument in which a cap formed of a transparent material is used for showing a pen tip having a window portion through which the writing direction is visible. In particular, coloration of the condensed liquid may be evident in a writing instrument loaded with an ink prepared using an oil-soluble dye, a water-soluble dye, or a pigment as a coloring material, and thus a countermeasure is required.

Thus, a water evaporation prevention and condensation prevention device for a writing instrument is known. This water evaporation prevention and condensation prevention device is characterized in that a liquid absorber having continuous pores is installed in a barrel of a writing instrument containing an ink cylinder containing an aqueous ink in the barrel, and a saturated aqueous solution of a salt is absorbed in the liquid absorber, the saturated aqueous solution of a salt giving a relative humidity of 75 to 95% in a closed atmosphere at normal temperature (see, e.g., Patent Document 1).

In addition, to provide a writing instrument that allows visual recognition of the pen tip shape, the color tone and remaining amount of ink in the writing instrument without causing color fading or browning of handwriting formed by the writing instrument from the initial stage and without impairing the appearance of the handwriting even though the writing instrument uses a member, such as a cap, formed of a material having transparency, the following writing instrument is known:

a writing instrument including:
   an ink containing a colorant selected from:
      a reversible thermochromic material containing (a) an electron-donating organic compound, (b) an electron-accepting organic compound, and (c) a reaction medium determining the occurrence temperature of color reaction of (a) and (b) above,
      a photochromic organic material,
      a dye, and
      a fluorescent pigment;
   an ink absorber containing the ink;
   a barrel containing the ink absorber inside;
   a pen tip capable of discharging the ink;
   a holding body for holding the pen tip; and
   a cap that is removably attached on the pen tip side of the barrel, the cap being formed of a material having transparency, in which
      an ultraviolet absorber or a transparent ultraviolet shielding agent is contained in the cap, or
      a photostabilizing layer containing an ultraviolet absorber or a transparent ultraviolet shielding agent is provided on the cap surface.

Furthermore, the following are also known:
   a photostabilizer is contained in the cap, or a photostabilizer is contained in the photostabilizing layer;
   the holding body is formed of a material having transparency; and
   an ultraviolet absorber or a transparent ultraviolet shielding agent is contained in the holding body, or a photostabilizing layer containing an ultraviolet absorber or a transparent ultraviolet shielding agent is provided on a surface of the holding body (see, e.g., Patent Document 2).

CITATION LIST

Patent Document

Patent Document 1: JP S61-40551 UM-B (Claims, FIG. 1, etc.)
Patent Document 2: JP 2020-49672 A (Claims, FIGS. 1 to 6, etc.)

SUMMARY OF INVENTION

Technical Problem

The water evaporation prevention and condensation prevention device for a writing instrument of the Patent Document 1 above is to prevent water evaporation and condensation by mounting the liquid absorber having continuous pores and specific physical properties in the barrel, and to disclose a technique close to the present invention. However, the present invention is to inhibit or prevent condensation and more effectively prevent drying-up during storage from the viewpoints of ink composition, and physical properties, and thus the technical idea of the present invention is different from that described in Patent Document 1.

In the writing instrument of Patent Document 2, in the case where the cap or the holder is formed of a material having transparency to allow visual recognition of the pen tip shape and the color tone and remaining amount of ink in the writing instrument, an ultraviolet absorber or a transparent ultraviolet shielding agent is contained in the cap or the holder, or a photostabilizing layer is formed on the surface of the cap or the holder. Thus, the object and technical idea described in this patent document are different from those of the present invention.

In view of the above problems of the related art and the current status, the present invention is to solve these. An object of the present invention is to provide a writing instrument in which condensation does not occur in a cap even though the writing instrument is equipped with the cap and which has high writing instrument quality and commercial value. Another object of the present invention is to provide a writing instrument that can more effectively prevent drying-up during storage.

Solution to Problem

As a result of diligent study in view of the above problems of the related art, the present inventors have found that each of the writing instruments according to the above objects is achieved by providing the writing instrument with at least a barrel in which an aqueous ink is contained, a pen tip provided on a tip side of the barrel and capable of discharging the aqueous ink, and a cap that is removably attached on the pen tip side of the barrel, and preparing the aqueous ink to have specific physical properties and specific blending composition, and have completed the present invention.

That is, the writing instrument of the present invention is a writing instrument including at least:
a barrel in which an aqueous ink is contained;
a pen tip provided on a tip side of the barrel and capable of discharging the aqueous ink; and
a cap that is removably attached on a pen tip side of the barrel, wherein
the aqueous ink has a vapor pressure of 10.3 to 12.3 kPa at 50° C.

The aqueous ink preferably further contains a water-soluble betaine. The pen tip preferably has a window portion through which a writing direction is visible.

An inner surface of the cap is preferably subjected to a hydrophilization treatment.

Advantageous Effects of Invention

According to the present invention, there is provided a writing instrument having high writing instrument quality and commercial value in which condensation does not occur in a cap even though the writing instrument is equipped with the cap.

In addition, as subjecting the inner surface of the cap to a hydrophilization treatment reduces the contact angle of the inner surface and improves the wettability thereof, a condensed liquid spreads on the cap inner surface and increases the surface area to promote the volatilization of the condensed liquid. This provides the writing instrument with the ability to further prevent drying-up of the pen tip during storage (in a state where the cap is attached).

The object and effects of the present invention can be recognized and obtained especially by using the components and combinations indicated in claims. Both of the aforementioned general description and the following detailed description are exemplary and explanatory and do not limit the present invention described in claims.

DESCRIPTION OF EMBODIMENTS

Embodiments of the present invention will be described in detail below with reference to drawings. However, it should be noted that the technical scope of the present invention is not limited to the embodiments described below and includes the invention described in claims and their equivalents. In addition, the present invention can be implemented based on the contents disclosed in the present specification and technical common sense (including design matters and obvious matters) in the relevant field.

Figure 1:
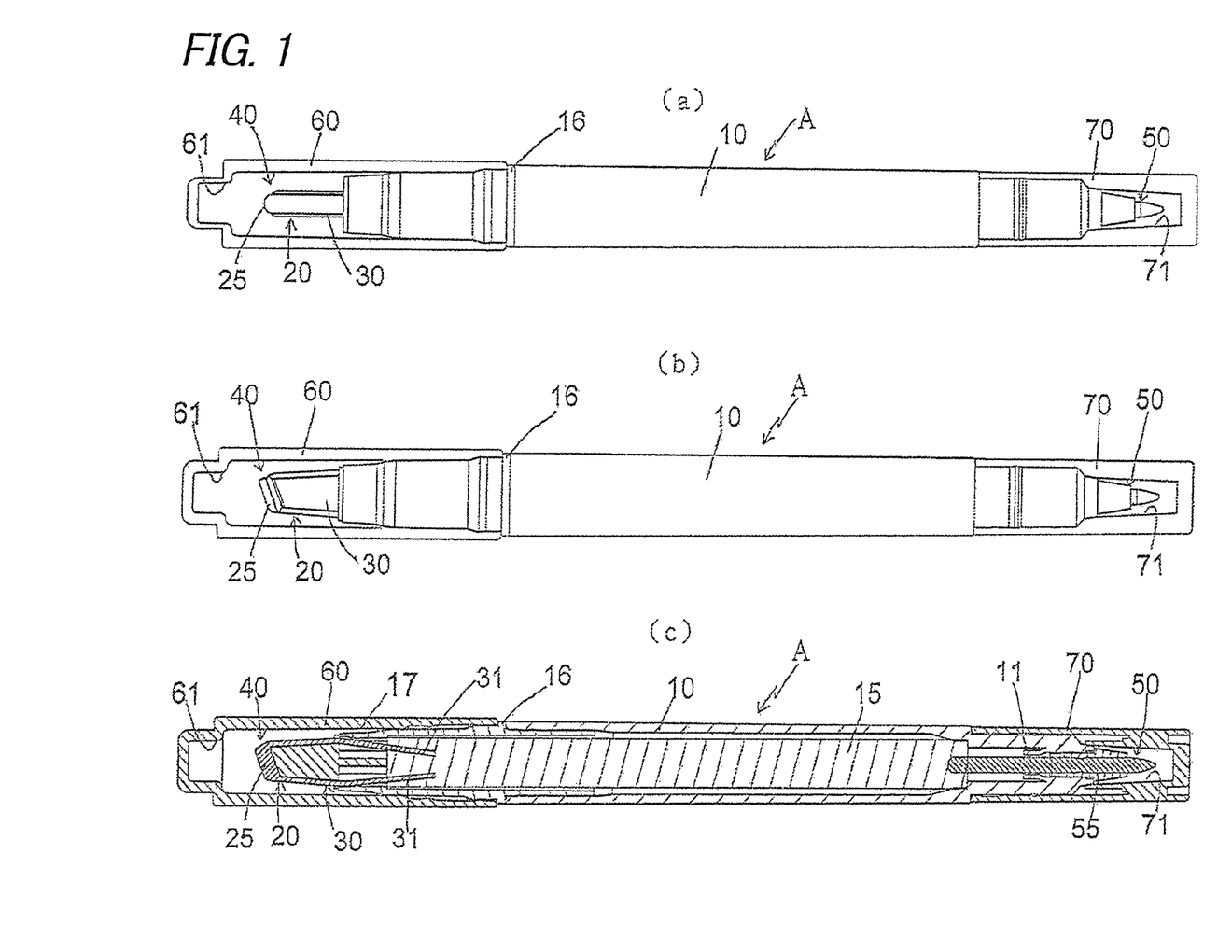
FIG. 1 is views illustrating an embodiment (first embodiment) of the writing instrument of the present invention equipped with a cap; (a) is a plan view, (b) is a front view, and (c) is a vertical cross-sectional view as seen from the front.
Figure 2:
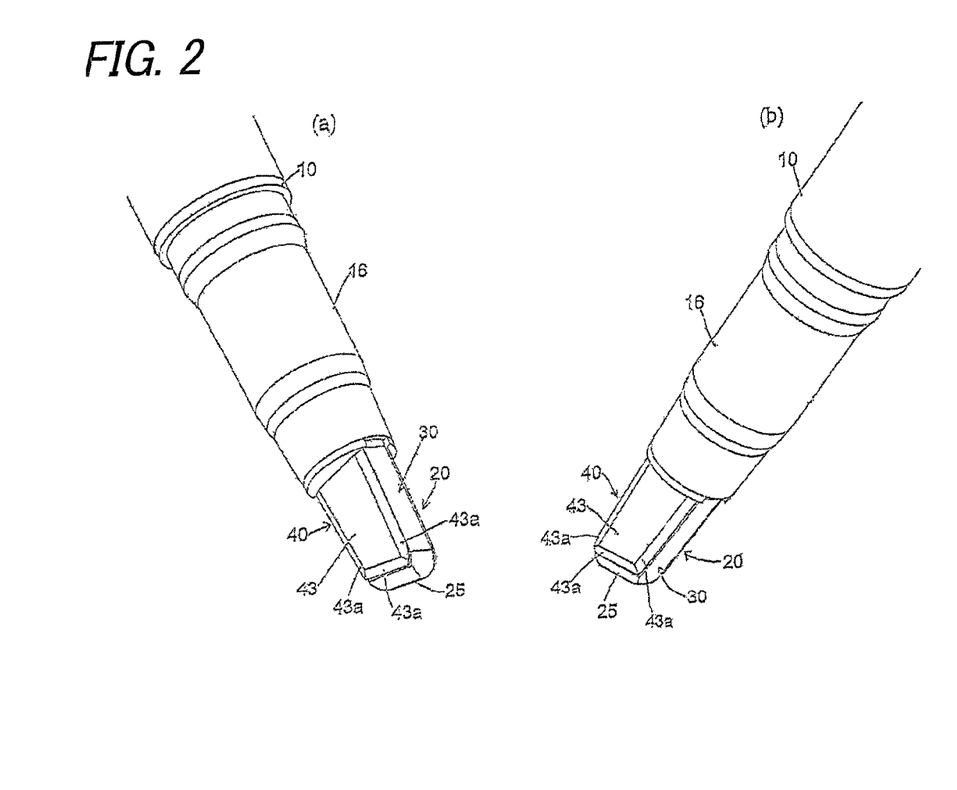
FIG. 2 is enlarged perspective views of a pen tip of the writing instrument of FIG. 1; (a) is an enlarged perspective view of the pen tip as seen from one direction, and (b) is an enlarged perspective view of the pen tip as seen from a direction rotated by 180° with respect to that in (a).

Writing Instrument of First Embodiment: FIGS. 1 and 2

As illustrated in FIGS. 1(a) to (c), the writing instrument of the present embodiment is a writing instrument A including at least:
a barrel 10 in which an aqueous ink is contained through an ink absorber 15;
a pen tip 20 provided on a tip side of the barrel 10 and capable of discharging the aqueous ink; and
a cap 60 that is removably attached on the pen tip 20 side of the barrel 10; wherein
the aqueous ink has a vapor pressure of 10.3 to 12.3 kPa at 50° C.

Aqueous Ink

For example, the aqueous ink used in the present embodiment needs to have a vapor pressure of 10.3 to 12.3 kPa at 50° C. The blending composition of the aqueous ink is not particularly limited as long as the vapor pressure falls within this range, and for example, the aqueous ink preferably contains at least a coloring material and water.

Coloring Material

Examples of the coloring material that can be used include those used for writing instruments, for example, a dye dissolved or dispersed in water; an inorganic or organic pigment system that has been known in the art, such as titanium oxide; colored resin fine particles or a dispersion thereof [including a resin particle pigment containing a pigment, a pseudo pigment produced by coloring a resin emulsion with a dye, a white plastic pigment, or a hollow resin pigment (particles)]; a pigment multilayer-coating the surface of the base material of silica or mica with iron oxide or titanium oxide; a thermochromic pigment; a photochromic pigment; and a composite pigment of these.

Examples of the dye include a fluorescent dye, a water-soluble dye, and an oil-soluble dye.

The fluorescent dye that can be used is not particularly limited as long as the dye has good color development, and examples include Basic Yellow 1 and 40; Basic Red 1, 1:1, and 13; Basic Violet 1, 7, 10, and 11:1; Basic Orange 22; Basic Blue 7; Basic Green 1; Acid Yellow 3 and 7; Acid Red 52, 77, 87, and 92; Acid Blue 9; Disperse Yellow 121, 82, and 83; Disperse Orange 11, Disperse Red 58; Disperse Blue 7; Direct Yellow 85; Direct Orange 8; Direct Red 9; Direct Blue 22; Direct Green 6; Solvent Yellow 44; Solvent Red 49; Solvent Blue 5; and Solvent Green 7. In particular, among the fluorescent dyes, an azomethine-based, xanthene-based, or triphenylmethane-based fluorescent dye is preferably used from the viewpoints of color development and ink stability. Specifically, particularly preferred examples of the fluorescent dye include azomethine-based fluorescent dyes such as Basic Yellow 1 and 40; xanthene-based fluorescent dyes such as Basic Red 1:1 and Basic Violet 11:1; triphenylmethane-based fluorescent dyes such as Basic Violet 1. These dyes may be used alone or in combination of two or more types.

Examples of the oil-soluble dye that can be used include C.I. Solvent Black 7 and 123; C.I. Solvent Blue 2, 25, 55, and 70; C.I. Solvent Red 8, 49, and 100; C.I. Solvent Violet 8 and 21; C.I. Solvent Green 3; C.I. Solvent Yellow 21, 44, and 61; and C.I. Solvent Orange 37.

Examples of the water-soluble dye that can be used include acid dyes, basic dyes, direct dyes, and food dyes. Examples include acid dyes, such as C.I. Acid Black 1, 2, 24, 26, 31, 52, 107, 109, 110, 119, and 154, C.I. Acid Yellow 1, 7, 17, 19, 23, 25, 29, 38, 42, 49, 61, 72, 78, 110, 127, 135, 141, and 142, C.I. Acid Red 8, 9, 14, 18, 26, 27, 35, 37, 51, 52, 57, 82, 83, 87, 92, 94, 111, 129, 131, 138, 186, 249, 254, 265, and 276, C.I. Acid Violet 15, 17, and 49, C.I. Acid Blue 1, 7, 9, 15, 22, 23, 25, 40, 41, 43, 62, 78, 83, 90, 93, 100, 103, 104, 112, 113, and 158, C.I. Acid Green 3, 9, 16, 25, and 27, and C.I. Acid Orange 56; basic dyes, such as Malachite Green (C.I. 42000), Victoria Blue FB (C.I. 44045), Methyl Violet FN (C.I. 42535), Rhodamine F4G (C.I. 45160), and Rhodamine 6GCP (C.I. 45160); direct dyes, such as C.I. Direct Black 17, 19, 22, 32, 38, 51, and 71, C.I. Direct Yellow 4, 26, 44, and 50, C.I. Direct Red 1, 4, 23, 31, 37, 39, 75, 80, 81, 83, 225, 226, and 227, C.I. Direct Blue 1, 15, 41, 71, 86, 87, 106, 108, and 199; and Food dyes, such as C.I. Food Yellow 3.

Examples of the inorganic pigment include azo lake, insoluble azo pigments, chelate azo pigments, phthalocyanine pigments, perylene and perinone pigments, and nitroso pigments. More specific examples include inorganic pigments, such as carbon black, titanium black, zinc oxide, colcothar, aluminum, chromium oxide, iron black, cobalt blue, iron oxide yellow, viridian, zinc sulfide, lithopone, cadmium yellow, vermilion, cadmium red, chrome yellow, molybdate orange, zinc chromate, strontium chromate, white carbon, clay, talc, ultramarine blue, precipitated barium sulfate, barite powder, calcium carbonate, white lead, navy blue and white, Prussian blue, manganese violet, aluminum powder, and brass powder; and organic pigments, such as C.I. Pigment Blue 15 and 17, C.I. Pigment Blue 17 and 27, C.I. Pigment Red 5, 22, 38, 48, 49, 53, 57, 81, 104, 146, and 245, C.I. Pigment Yellow 1, 3, 12, 13, 14, 17, 34, 55, 74, 95, 166, and 167, C.I. Pigment Orange 5, 13, and 16, C.I. Pigment Violet 1, 3, 19, 23, and 50, and C.I. Pigment Green 7.

Examples of the colored resin fine particles or the dispersion thereof include:
a dispersion of colored resin fine particles in which the colored resin fine particles are dispersed in water, the colored resin fine particles composed of at least:
  a carboxyl group-containing vinyl monomer (A) with a solubility in water of 10 mass % or less as an acidic functional group,
  an ester monomer (B) of acrylic acid or methacrylic acid and a linear or cyclic alcohol having 2 to 18 carbons, and
  an basic dye or an oil-soluble dye; and a dispersion of colored resin fine particles in which the colored resin fine particles are dispersed in water, the colored resin fine particles composed of:
  a cyclohexyl (meth)acrylate monomer, and
  a basic dye or an oil-soluble dye, in which
    the content of the cyclohexyl (meth)acrylate monomer is 30 mass % or more relative to the entire polymer component constituting the colored resin fine particles, and
    the content of the basic dye or the oil-soluble dye is 15 mass % or more relative to the entire polymer component.

Examples of the thermochromic pigment include a thermochromic pigment produced by microencapsulating a thermochromic composition to achieve a predetermined average particle size (e.g., 0.1 to 10 μm), the thermochromic composition containing at least:
  a leuco dye functioning as a color former,
  a color developer serving as a component having an ability to develop a color of the leuco dye, and
  a discoloration temperature adjuster capable of controlling a discoloration temperature in coloration of the leuco dye and the color developer.

Examples of the photochromic pigment include:
photochromic particles composed of at least:
  one or more types selected from photochromic dyes (compounds) and fluorescent dyes, and
  a resin such as a terpene phenolic resin; and
a photochromic pigment produced by microencapsulating photochromic composition to achieve a predetermined average particle size (e.g., 0.1 to 10 μm), the photochromic composition containing at least:
  one or more types selected from photochromic dyes (compounds) and fluorescent dyes,
  an organic solvent, and
  an additive, such as an antioxidant, a light stabilizer, or a sensitizer.

In the present invention (including Examples), the "average particle size" is a value of D50 calculated on a volume basis with a refractive index of 1.81 using a particle size distribution analyzer HR9320-X100 (available from Nikkiso Co., Ltd.).

These coloring materials can be used alone or in a combination of two or more types (hereinafter referred to simply as "at least one").

Desirably, the (total) (solid) content of these coloring materials is preferably 0.1 to 40 mass % and more preferably 1 to 30 mass % relative to the total amount of the aqueous ink.

When the content of the coloring material of 0.1 mass % or more, sufficient drawn line density can be achieved, whereas when the content is 40 mass % or less, an increase in viscosity is suppressed, and the ink has good fluidity, which is preferred.

Additional Component

As long as the aqueous ink has a vapor pressure in a range of 10.3 to 12.5 kPa at 50° C., the aqueous ink of the present embodiment can contain a component commonly used in aqueous inks, such as, for example, a dispersant, a surfactant, a glycol, a glycol ether, a hydrophilic polyhydric alcohol, a water-soluble betaine, a viscosity modifier, a fixing resin, a rust inhibitor, an antiseptic or antibacterial agent, or a pH adjuster, as necessary in a range of having the effects of the present invention in addition to the coloring material and, as a solvent, water (such as tap water, purified water, distilled water, ion-exchanged water, or pure water) as a balance.

The aqueous ink can contain a water-soluble resin as the dispersant and fixing resin that can be used. For example, at least one can be selected from water-soluble resins, such as acrylic resins, poly(vinyl alcohol), poly(vinylpyrrolidone), poly(ethylene oxide), and urethane-based resins; and resin emulsions, such as acrylic emulsions, vinyl acetate-based emulsions, urethane-based emulsions, and polyolefin-based emulsions.

The surfactant that can be used is not particularly limited, and at least one surfactant selected from fluorine-based surfactants, acetylene glycol-based surfactants, and silicone-based surfactants can be used.

Examples of the glycol and glycol ether that can be used include glycols, such as ethylene glycol, propylene glycol, diethylene glycol, triethylene glycol, tripropylene glycol, tetraethylene glycol, dipropylene glycol, polyethylene glycol, polypropylene glycol, neopentyl glycol, 1,3-octylene glycol, hexylene glycol, tripropylene glycol, thiodiethylene glycol, and glycerin; and glycol ethers, such as ethylene glycol monomethyl ether and diethylene glycol monomethyl ether. One of these may be used, or two or more of these may be used in combination.

Examples of the hydrophilic polyhydric alcohol that can be used include pentaerythritol, trimethylolethane, and trimethylolpropane.

The water-soluble betaine (amphoteric compound) is a compound having a positive charge and a negative charge that are not adjacent to each other in the same molecule and having no charge as a whole molecule. The positively charged site is preferably a quaternary ammonium cation. Examples of such a betaine include, but are not particularly limited to, trimethylglycine, γ-butyrobetaine, homarine, trigonelline, carnitine, homoserine betaine, valine betaine, lysine betaine, ornithine betaine, alanine betaine, stachydrine, and glutamic acid betaine. Among these, trimethylglycine, γ-butyrobetaine, or carnitine is preferred, and trimethylglycine is more preferred. The use of such a water-soluble betaine tends to further improve the effects of the present invention. One water-soluble betaine may be used alone, or two or more types may be used in combination.

For the viscosity modifier, a natural polymer such as a polysaccharide, or a synthetic polymer can be used. Examples of the polysaccharide that can be used include arabic gum, tragacanth gum, guar gum, locust bean gum, alginic acid, carrageenan, gelatin, xanthan gum, welan gum, succinoglycan, diutan gum, dextran, cellulose derivatives such as methyl cellulose, ethyl cellulose, hydroxyethyl cellulose, and carboxymethyl cellulose, and starch glycolic acid and its salts. Examples of the synthetic polymer that can be used include poly(vinylpyrrolidone), poly(vinyl methyl ether), poly(acrylic acid) and its salts, poly(ethylene oxide), a vinyl acetate-poly(vinylpyrrolidone) copolymer, a styrene-acrylic acid copolymer and its salt, and an isobutylene maleic anhydride copolymer and its salt.

For the antiseptic or antibacterial agent, phenol, sodium omadine, sodium benzoate, benzisothiazoline, or a benzimidazole compound can be used. In addition, examples of the rust inhibitor that can be used include benzotriazole, tolyltriazole, dicyclohexylammonium nitrite, and saponins.

For the pH adjuster, an amine compound such as triethanolamine, diethanolamine, monoethanolamine, dimethylethanolamine, morpholine, or triethylamine, ammonia, or a hydroxide of an alkali metal, such as sodium hydroxide, potassium hydroxide, or lithium hydroxide can be used.

In the present embodiment, the aqueous ink contains at least the coloring material and water and has a vapor pressure of 10.3 to 12.3 kPa at 50° C. In a preferred embodiment, the aqueous ink having a vapor pressure of 10.3 to 12.5 kPa at 50° C. can be preferably prepared by suitably combining (e.g., the type and the blended amount) of a polyhydric alcohol (pentaerythritol, trimethylolethane, or trimethylolpropane) and a water-soluble betaine (amphoteric compound) such as trimethylglycine in addition to the glycol described above.

In the present embodiment (including Examples described below), the "vapor pressure at 50° C." refers to a value measured by a static method. The use of the aqueous ink having a vapor pressure of 10.3 to 12.3 kPa at 50° C., preferably a vapor pressure of 10.3 to 12.0 kPa at 50° C., and particularly preferably a vapor pressure of 10.3 to 11.1 kPa at 50° C. allows a cap-equipped writing instrument to exhibit a unique effect without causing condensation in the cap as described below.

An aqueous ink having a vapor pressure of less than 10.3 kPa at 50° C. would have high ink viscosity, making it impossible to write normally with the ink and reducing the drying properties of the drawn line. Meanwhile, an aqueous ink having a vapor pressure of more than 12.3 kPa at 50° C. would fail to prevent condensation and cause a problem of drying-up of the pen tip at the time of removal of the cap, which is not preferred.

The aqueous ink of the present embodiment for a writing instrument, the aqueous ink having a composition having a vapor pressure in a range of 10.3 to 12.3 kPa at 50° C., is obtained by, for example, combining at least the coloring material, water, and additional components appropriately according to the application of the ink for a writing instrument (for, for example, a marking pen) and combining to achieve a suitable blended amount (including the above preferred embodiment);

mixing the components by stirring with a stirrer, such as a homomixer, a homogenizer, or a disperser; and further removing coarse particles in the ink composition as necessary by filtration or centrifugation.

In addition, the pH (25° C.) of the aqueous ink of the present embodiment is desired to be adjusted to preferably 5 to 10 and more preferably 6 to 9.5 using a pH adjuster from the viewpoints of usability, safety, stability of the ink itself, and matching properties with the ink container.

Writing Instrument of First Embodiment: Specific Configuration

FIG. 1(a) is a plan view of the writing instrument equipped with a cap of the present embodiment, FIG. 1(b) is a front view thereof, and FIG. 1(c) is a vertical cross-sectional view thereof as seen from the front. FIG. 2 is enlarged perspective views of the pen tip of the writing instrument of FIG. 1; (a) is an enlarged perspective view of the pen tip as seen from one direction, and (b) is an enlarged perspective view of the pen tip as seen from a direction rotated by 180° with respect to that in (a).

The writing instrument A of the present embodiment is loaded with the aqueous ink having the above characteristics, and as illustrated in FIGS. 1(a) to (c), the writing instrument A is a twin-type writing instrument including:

a pen tip 20 having a window portion (visible portion) for guiding the aqueous ink supplied from an ink absorber 15 of a barrel (writing instrument main body) 10 and allowing visual recognition of the writing direction; and a rod-shaped polyacetal-made pen tip 50 on the side opposite to the pen tip 20. In addition, a removable cap 60 for protecting the pen tip 20 and a cap 70 for protecting the pen tip 50 are attached to both sides of the writing instrument main body 10.

The barrel 10 is formed, for example, of a thermoplastic resin or a thermosetting resin, and is formed of a cylindrical body for containing the ink absorber 15 impregnated with the aqueous ink having the above characteristics. One end on the right side in the drawing is a holding portion 11 having a fitting portion for fixing a holder 55 by fitting, the holder 55 for holding the rod-shaped thin character-type pen tip 50. A front barrel 16 is attached to the other end on the left side for fixing the pen tip 20 having the visible portion serving as the window portion through which the writing direction is visible.

The barrel 10 is molded into a cylindrical shape using, for example, a resin containing polypropylene and functions as the writing instrument main body (barrel body). Although the barrel 10 is molded to be opaque or transparent (and translucent), either may be adopted from the viewpoint of appearance and practicality.

The ink absorber 15 is impregnated with the aqueous ink having a vapor pressure of 10.3 to 12.5 kPa at 50° C. as described above and includes, for example, a fiber bundle composed of:

one type or a combination of two or more types of natural fiber, animal hair fiber, a polyacetal-based resin, an acrylic resin, a polyester-based resin, a polyamide-based resin, a polyurethane-based resin, a polyolefin-based resin, a polyvinyl-based resin, a polycarbonate-based resin, a polyether-based resin, and a polyphenylene-based resin;

a processed fiber bundle, such as felt; and a porous body, such as sponge, resin particles, and a sintered body. The ink absorber 15 is contained and held in the barrel 10 serving as the writing instrument main body.

As illustrated in FIGS. 2(*a*) and (*b*), the pen tip 20 is formed of a writing core 30 having at least a writing portion 25, and a holding body 40 having the visible portion. The writing core 30 having the writing portion 25 is attached to the holding body 40 described below by adhesion, welding, or fitting.

The writing core 30 has:

the writing portion 25 having an inclined shape (knife-cut shape) to be inclined to facilitate writing; and thin plate bodies (sheet bodies) 31, 31 in the portion other than the writing portion 25 from both end portions of the writing portion 25, wherein these plate bodies are integrally provided continuously, the outer shape is formed in a substantial U-shape (also including an angular U-shape), and the thin plate bodies 31, 31 have a rectangular cross section. The writing core 30 is not particularly limited as long as it efficiently guides (supplies) the aqueous ink having the vapor pressure characteristics described above absorbed in the barrel 10 to the writing portion 25 through the thin plate bodies 31, 31. The wring core 30 is formed of, for example, a fabric such as nonwoven fabric, woven fabric, or knitted fabric, or a material having liquid permeability, such as a liquid permeable foam or a sintered body. The writing core 30 including the writing portion 25 can be formed of one type of material, but may be formed by combining a plurality of materials through lamination, or may be formed by connecting or bonding the writing portion 25 and a member other than the writing portion 25 to each other.

The shape and thickness of the writing core 30 having the writing portion 25 are determined from the viewpoints of, for example, an aspect of attaching to the holding body 40, the shape of the writing portion 25, maximization of the visible area of the visible portion 43, and efficiently flowing out (supplying) the ink to the writing portion. Preferably, the lateral length and the longitudinal length correspond to the lateral length and the circumferential length of the attachment surface of the below-described holding body 40 for fixing the thin plate bodies 31, 31 of the writing core 30, and these lengths are suitably determined for efficiently flowing out the ink to the writing portion 25. In addition, the thicknesses of the thin plate bodies 31, 31 other than the writing portion 25 of the writing core 30 are preferably 0.3 to 3.0 mm and most preferably 0.5 to 1.0 mm from the viewpoint of maximizing the visible area of the visible portion 43.

In the present embodiment, the writing portion 25 is integrally formed with the thin plate bodies 31, 31 of the writing core 30 and has an inclined shape (knife-cut shape) to be inclined to facilitate writing, and this inclination is appropriately determined in accordance with the usability for writing. In addition, the writing portion 25 produces a large line width and is desired to be a writing portion to produce a line width of preferably 1 mm or more and more preferably 2 mm or more.

The writing core 30 including the writing portion 25 of the present embodiment is integrally formed of a sintered core obtained by sintering plastic powder.

In the above embodiment, the writing portion 25 and the thin plate bodies 31, 31 of the writing core 30 are integrally formed of the same material, but the writing portion 25 and the thin plate bodies 31, 31 may be formed of different members and may be connected, bonded, or brought into contact. The writing portion 25 is formed of, for example, a porous material having pores, and specific examples of the material include a sponge body, a sintered body, a fiber bundle body, a foam body, a spongy body, a felt body, and a porous body. Examples of the material that can be used for forming the porous body include natural fiber, animal hair fiber, a polyacetal-based resin, a polyethylene-based resin, an acrylic resin, a polyester-based resin, a polyamide-based resin, a polyurethane-based resin, a polyolefin-based resin, a polyvinyl-based resin, a polycarbonate-based resin, a polyether-based resin, and a polyphenylene-based resin. Specifically, the writing portion 25 may be formed of a sintered body obtained by sintering any plastic powder, and the thin plate bodies 31, 31 may be formed of a fabric such as a nonwoven fabric, a woven fabric, or a knitted fabric, or a liquid-permeable material, such as a liquid-permeable foam.

The holding body 40 fixes the writing portion 25 and the thin plate bodies 31, 31 of the writing core 30 and is fixed to a tip opening of the front barrel 16 of the writing instrument main body 10, and has the visible portion (visual recognition portion) 43 through which the writing direction is visible.

In the holding body 40, the portions (thin plate-like bodies 31, 31) in contact with the side surfaces of the holding body 40 of the writing core 30 have a rectangular cross-sectional shape, and the outer peripheral edges of the visible portion 43, which are the front end portions of the holding body 40, are formed as inclined refracting surfaces 43*a*, 43*a*.

The portions in contact with the side surfaces of the holding body 40 of the writing core 30 have a rectangular cross-sectional shape, which can increase the width of the visible portion 43 relative to the cross-sectional area. In addition, the outer peripheral edges of the visible portion 43 of the holding body 40 are formed as the inclined refracting surfaces 43a, 43a, which allows the rectangular cross section to look thin and allows the area of the visible portion 43 to look larger as compared with a case of the related art.

The entire holding body 40 thus configured is formed of a hard material and, for example, formed of a hard material providing visibility, such as glass or a resin having no rubber elasticity. Examples of the resin having no rubber elasticity and providing visibility include a material having a visible light transmittance of 50% or more, such as PP, PE, PET, PEN, nylon (including amorphous nylon in addition to common nylon, such as 6 nylon or 12 nylon), acrylic resin, polymethylpentene, polystyrene, or ABS. Formation of the entire holding body 40 by molding of such a resin allows letters and characters written in the writing direction to be effectively visible through the visible portion 43. Only the visible portion 43 (including the inclined refracting surfaces 43a, 43a) may be formed of a material providing visibility. The visible light transmittance (transmittance) can be determined by measuring the reflectance with a multiple light source spectrocolorimeter [available from Suga Test Instruments Co., Ltd., (MSC-5N)].

The holding body 40 may be formed from one of the above materials, or two or more of the above materials from the viewpoint of further improvements in durability and visibility. The holding body 40 can be formed by any molding method such as injection molding or blow molding.

The thin plate bodies 31, 31 of the writing core 30 are fixed to the attachment surfaces of angular U-shaped (U-shaped) holding grooves of the holding body 40 by adhesion with an adhesive or welding, and are fixed to the writing portion 25.

In the present embodiment, from the viewpoint of maximizing the visible area of the visible portion 43, the thicknesses of the thin plate bodies 31, 31 are smaller than the thickness of the writing portion 25, and the width of the ink guide portion is preferably less than 90% and more preferably 50 to 80% of the width of the visible portion 43 of the holding body 40.

As illustrated in FIGS. 1(a) to (c), the pen tip 50 is a rod-shaped pen tip of a thin character type and has a circular cross section, and the rear end portion (ink absorber side) of the pen tip 50 is inserted into the ink absorber 15, and the aqueous ink having the vapor pressure characteristics described above in the ink absorber is supplied to the pen tip 50 by capillary force.

This pen tip 50 is formed of a porous material; for example, formed of a parallel fiber bundle composed of one type or a combination of two or more types of natural fiber, animal hair fiber, a polyacetal-based resin, a polyethylene-based resin, an acrylic resin, a polyester-based resin, a polyamide-based resin, a polyurethane-based resin, a polyolefin-based resin, a polyvinyl-based resin, a polycarbonate-based resin, a polyether-based resin, and a polyphenylene-based resin; a processed fiber bundle obtained by processing a fiber bundle, such as felt, or a fiber core obtained by processing a fiber bundle of these with a resin; or a porous body (sintered core) obtained from plastic powder of a thermoplastic resin, such as a polyolefin-based resin, an acrylic resin, a polyester-based resin, a polyamide-based resin, or a polyurethane-based resin.

The pen tip 50 is preferably formed of a fiber bundle core, a fiber core, a sintered core, a felt core, a sponge core, or an inorganic porous core, and is particularly preferably formed of a fiber core, from the viewpoints of deformation moldability and productivity. The porosity, size, and hardness of the pen tip 50 to be used vary depending on the type of ink or the type of writing instrument. For example, the porosity is preferably 30 to 60%. In the present invention, the "porosity" is calculated as follows. Firstly, a writing core having a known mass and apparent volume is immersed in water and sufficiently impregnated with water, and then the mass is measured in a state of being taken out from water. From the measured mass, the volume of water impregnated into the writing core is calculated. With the assumption that the volume of water is the same as the pore volume of the writing core, the porosity is calculated from the following formula:

$$\text{Porosity (unit: \%)}=(\text{volume of water})/(\text{apparent volume of pen tip 50})\times 100$$

In the present embodiment, as illustrated in FIGS. 1(a) to (c), the cap 60 formed of a material having transparency and the cap 70 having an inner cap are removably attached by fitting to the outer peripheral portion on one pen tip 20 side and the outer peripheral portion on the other pen tip 50 side of the barrel 10.

The cap 60 and the cap 70 can be formed of, for example, a material having no transparency (material providing no visibility) or a material having transparency (material providing visibility).

Examples of the material having no transparency (material providing no visibility) include resins having no transparency (providing no visibility) and materials obtained using a colorant providing no visibility, such as carbon black, in a resin having transparency (providing visibility).

Examples of the material having transparency (providing visibility) include glass and materials composed of a resin having no rubber elasticity. Examples of the resin having transparency (providing visibility) and having no rubber elasticity include a material having a visible light transmittance of 50% or more, such as PP, PE, PET, PEN, nylon (including amorphous nylon in addition to common nylon, such as 6 nylon or 12 nylon), acrylic resin, polymethylpentene, polystyrene, and ABS. Formation of the cap 60 and the cap 70 by molding of such a resin allows the pen tips 20 and 50 to be seen (visible) from the outside through the cap 60 and the cap 70, respectively.

The cap 60 and the cap 70 may be entirely formed of a material having no transparency (material providing no visibility) or a material having transparency (providing visibility). In addition, in the case of a configuration where the pen tips 20 and 50 can be seen (visible) or the color tone of the ink can be seen (determined), the cap 60 and the cap 70 may be partially formed of a material having transparency (providing visibility) instead of being entirely formed of a material having transparency (providing visibility).

In a case where the aqueous ink having the above characteristics in the present embodiment is a thermochromic ink, contamination of the surroundings can be prevented by forming a thermoplastic elastomer having a capability of erasing pencil lines (rate of erasing letters and characters) specified in JIS S 6050-2002 of less than 70% on the top of the cap 60 to thereby form a friction body that easily generates frictional heat by rubbing motion and is low wear to reduce the generation of eraser dust during friction.

In the present embodiment, an inner surface 61 of the cap 60 and/or a surface 17 of the front barrel 16 are preferably subjected to a hydrophilization treatment to make them hydrophilic. Subjecting the inner surface 61 of the cap 60 and/or the surface 17 of the front barrel 16 to a hydrophilization treatment reduces their contact angles and improves their wettabilities. This spreads the condensed liquid on the inner surface 61 of the cap 60 and the surface 17 of the front barrel 16 and increases the surface area and promotes the volatilization of the condensed liquid. This provides a writing instrument that can prevent drying-up of the pen tip 20 during storage (in a state where the cap 60 is attached). The inner surface 71 of the cap 70 may also be subjected to a hydrophilization treatment to prevent drying-up of the pen tip 50.

Examples of the hydrophilization treatment include a coating agent for coating with a material with a contact angle with water of less than 90°; activation treatment, such as plasma treatment, ozone treatment, corona treatment, flame treatment, or radical activation treatment with an electron beam; and application of a hydrophilizing agent.

Examples of the coating agent include activating agent solutions described below; nonionic types, such as fatty acid esters of polyhydric alcohols, higher fatty acid esters of sugars, polyoxyalkylene higher fatty acid esters, and alkyl phosphate esters; anionic types, such as phosphate esters, alkyl sulfonate salts of a higher fatty acid amide, and alkyl allyl sulfonate salts; derivatives of polyalkylene glycols; fluorochemical surfactants; and polyether-modified silicones. The hydrophilization treatment can be performed with a polycyclic surfactant, such phenyl-type nonionic as poly(oxyethylene) distyrenated phenyl ether, poly(oxyethylene) monostyrenated phenyl ether, or poly(oxyethylene) cumyl phenyl ether; and an ionic surfactant, such as a sulfate salt of the polycyclic phenyl-type nonionic surfactant; an alkylphenol-type nonionic surfactant, such as poly(oxyethylene) alkylphenyl ether; a linear hydrocarbon-type non-ionic surfactant, such as poly(oxyethylene)-hardened castor oil or a poly(oxyethylene) alkyl (C10 to C18) ester; or a sorbitan derivative. The aforementioned activation treatment method, such as plasma treatment, ozone treatment, corona treatment, flame treatment, or radical activation treatment with an electron beam, is appropriately selected in accordance with the material of the cap. Examples of specific methods of the activation treatment include a method of treating the inner surface of the cap 60 and the surface of the front barrel 16 with corona or plasma in an atmosphere of vacuum to atmospheric pressure. Examples of the hydrophilizing agent include water-soluble resins, such as poly (vinyl alcohol), ethylene-vinyl alcohol copolymers, and ethylene-vinyl acetate copolymers; and silicate-based hydrophilizing agents containing an inorganic metal.

Furthermore, the contact angle of the inner surface of the cap 60 or the surface of the front barrel 16 with water is desired to be less than 90°, and the contact angle can be controlled by suitably selecting the hydrophilization treatment.

For achieving such a contact angle of less than 90°, the cap 60 or the front barrel 16 may be formed of a material having a contact angle with water of less than 90°. Examples of the material having this characteristic include poly(ethylene terephthalate) (PET), poly(butylene terephthalate) (PBT), and 66 nylon, and the cap 60 or the front barrel 16 is integrally molded or two-color molded from such a material.

For the writing instrument A thus configured, a twin-type writing instrument A can be easily manufactured by inserting the ink absorber 15 containing the aqueous ink having the above vapor pressure characteristics into the writing instrument main body 10 and holding; on the tip side, fixing the pen tip 20 having the above configuration by sequentially fitting through the front barrel 16; and on the other side, fixing by fitting the holder 55 to which the pen tip 50 is fixed. The aqueous ink having the vapor pressure described above absorbed in the ink absorber 15 is efficiently supplied by capillary force to the writing portion 25 through the thin plate bodies 31, 31 of the writing core 30 at the pen tip 20 as well as to the pen tip 50, and is used for writing.

For a marking pen-type writing instrument A of the present embodiment, in the case of using the cap 60 (including the cap 70) formed of a material having no transparency (material providing no visibility), even when the writing instrument is mistakenly placed in an environment with temperature change or temperature gradient, for example, a place exposed to direct sunlight, a place near a heating vent, a place near a heat source such as a PC, or on an electric carpet, the use of the aqueous ink having a vapor pressure of 10.3 to 12.3 kPa at 50° C. eliminates the occurrence of condensation in the cap 60 and provides the writing instrument with high writing instrument quality and high commercial value.

In addition, when the cap 60 (including the cap 70) formed of a material having transparency and having a large internal volume is used to show the pen tip 20 and the writing instrument is mistakenly placed in an environment with temperature change or temperature gradient, for example, a place exposed to direct sunlight, a place near a heating vent, a place near a heat source such as a PC, or on an electric carpet, the use of the aqueous ink having a vapor pressure of 10.3 to 12.3 kPa at 50° C. eliminates the occurrence of condensation in the cap 60 and does not impair the appearance. This also allows visual recognition of the shape of the pen tips 20 and 50 and the color tone of the aqueous ink (e.g., an ink color of yellow or pink) through the caps 60 and 70 and thus provides the writing instrument with high writing instrument quality and high commercial value (this point will be further described in detail in Examples below).

Furthermore, subjecting the inner surface 61 of the cap 60 to a hydrophilization treatment to make it hydrophilic reduces the contact angle between the condensed liquid and the inner surface 61 of the cap 60 and increases the surface area, which can promote the volatilization of the condensed liquid. In addition, the condensed liquid spreads on the inner surface 61 of the cap 60. This allows the condensed liquid to come into contact with a heating portion and promotes the volatilization of the condensed liquid, and makes it possible to prevent drying-up of the pen tip during storage (in a state where the cap is attached).

Exposing the pen core to temperature change or temperature distribution allows the ink to volatilize from the pen tip and to condense in the cap 60. This accelerates the volatilization of the ink from the pen tip 20. This also quickly volatilizes condensed droplets in the cap 60 and can restore the ink in the pen tip 60. This can quickly volatilize the condensed droplets and can prevent the drying-up of the pen tip during storage (in a state where the cap is attached).

Furthermore, this eliminates the need for a material for preventing evaporation into the ink, the material having been added for drying-up during storage, and can enhance the drying property, adherence, and strike-through resistance of the ink.

For the marking pen-type writing instrument A of the present embodiment, in the case of using the cap 60 (including the cap 70, the same shall apply hereinafter) formed of a material having transparency and having a large internal volume to show the pen tip 20, even when the writing instrument is mistakenly placed in an environment with temperature change or temperature gradient, for example, a place exposed to direct sunlight, a place near a heating vent, a place near a heat source such as a PC, or on an electric carpet, the use of the aqueous ink having a vapor pressure of 10.3 to 12.3 kPa at 50° C. eliminates the occurrence of condensation in the cap 60 and does not impair the appearance. This also allows visual recognition of the shape of the pen tips 20 and 50 and the color tone of the aqueous ink (e.g., an ink color of yellow or pink) through the caps 60 and 70 and thus provides the writing instrument with high writing instrument quality and high commercial value (this point will be further described in detail in Examples below).

In this writing instrument A, the pen tip 50 is similar to a pen tip generally used in the art, and thus the function of the pen tip 20 will be described. As illustrated in FIGS. 1 and 2, the pen tip 20 has the visible portion (window portion) 43 through which the writing direction is visible, and the aqueous ink having the vapor pressure characteristics described above in the ink absorber 15 reaches the writing portion 25 by the capillary force of the thin plate bodies 31, 31 of the writing core 30 and is used for writing. At the time of writing, looking at the visible side through the visible portion (window portion) 43 facilitates easy adjustment of the starting position of drawing and makes it possible to stop drawing exactly at a desired part of the end of drawing and to prevent excessive drawing and to prevent the drawing from extending off.

Furthermore, the pen tip 20 guides the ink from the ink absorber 15 to the writing portion 25 through thin plate bodies 31, 31 of the writing core 30, the thin plate bodies 31, 31 having a thickness smaller than that of the writing portion 25 and outflow properties. In addition, these thin plate bodies 31, 31 are formed of a sheet-like porous body and thus have good ink outflow properties and need not be designed to be thick and do not interfere with the visible portion 43. Moreover, the portions in contact with the side surfaces of the holding body 40 of the writing core 30 have a rectangular cross-sectional shape, which can increase the width of the visible portion 43 relative to the cross-sectional area. In addition, the outer peripheral edges of the visible portion 43 of the holding body 40 are formed as the inclined refracting surfaces 43a, 43a, which allows the rectangular cross section to look thin. Thus, for example, in the case of writing with a right hand from left to right direction, a line can be drawn with the writing portion 25 while the writing direction is visually recognized through the visible portion 43. Furthermore, together with the maximization of the effective area of the visible portion relative to the entire pen tip, the thin plate bodies 31, 31 having the above characteristics efficiently supply the ink to the integrally formed writing portion 25, thus achieving good ink outflow properties and providing the writing instrument with the ability to achieve maximization of the effective area of the visible portion 43 without impairing the ink outflow properties.

Figure 3:
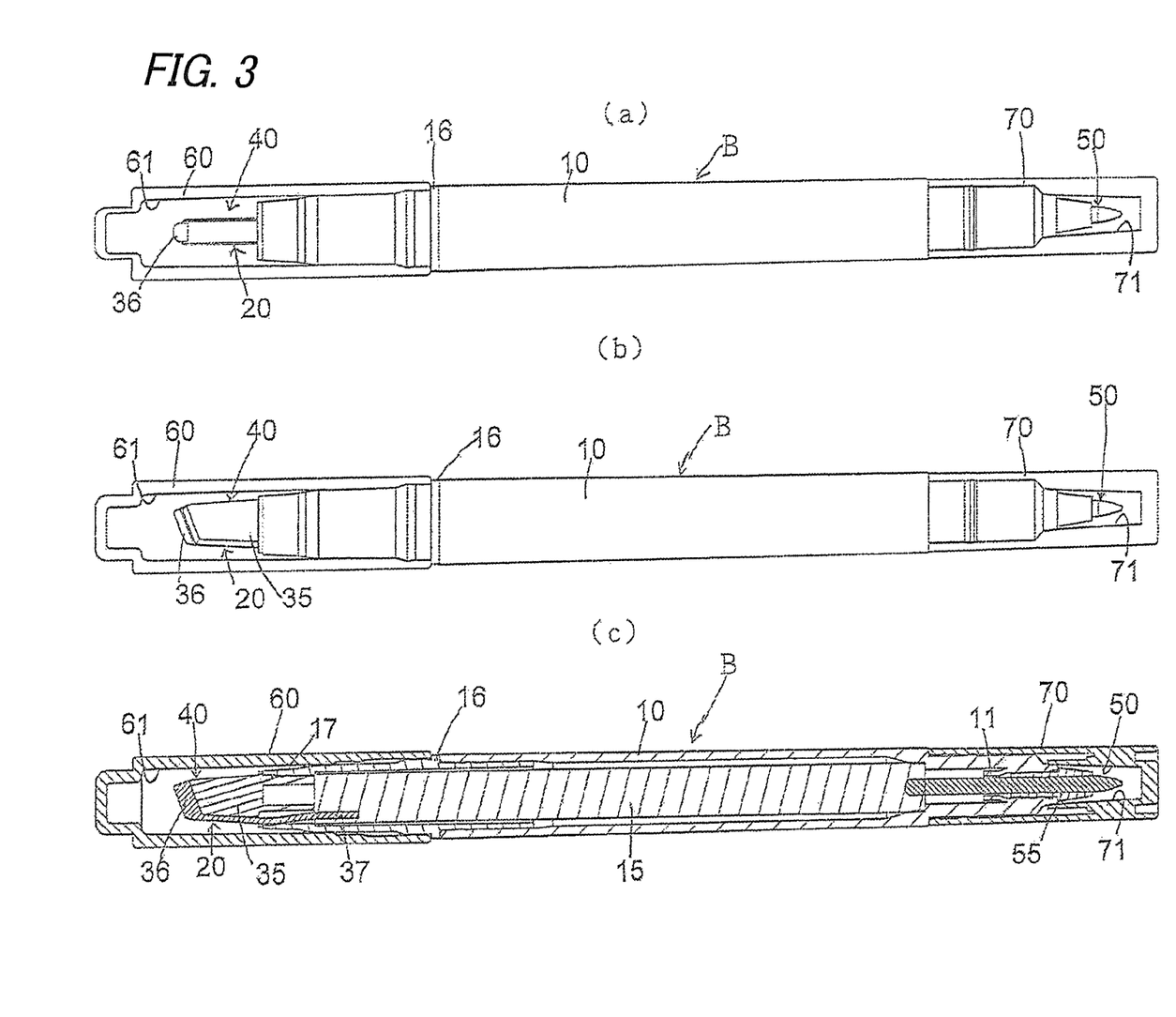
FIG. 3 is views illustrating another embodiment (second embodiment) of the writing instrument of the present invention equipped with a cap; (a) is a plan view, (b) is a front view, and (c) is a vertical cross-sectional view as seen from the front.
Figure 4:
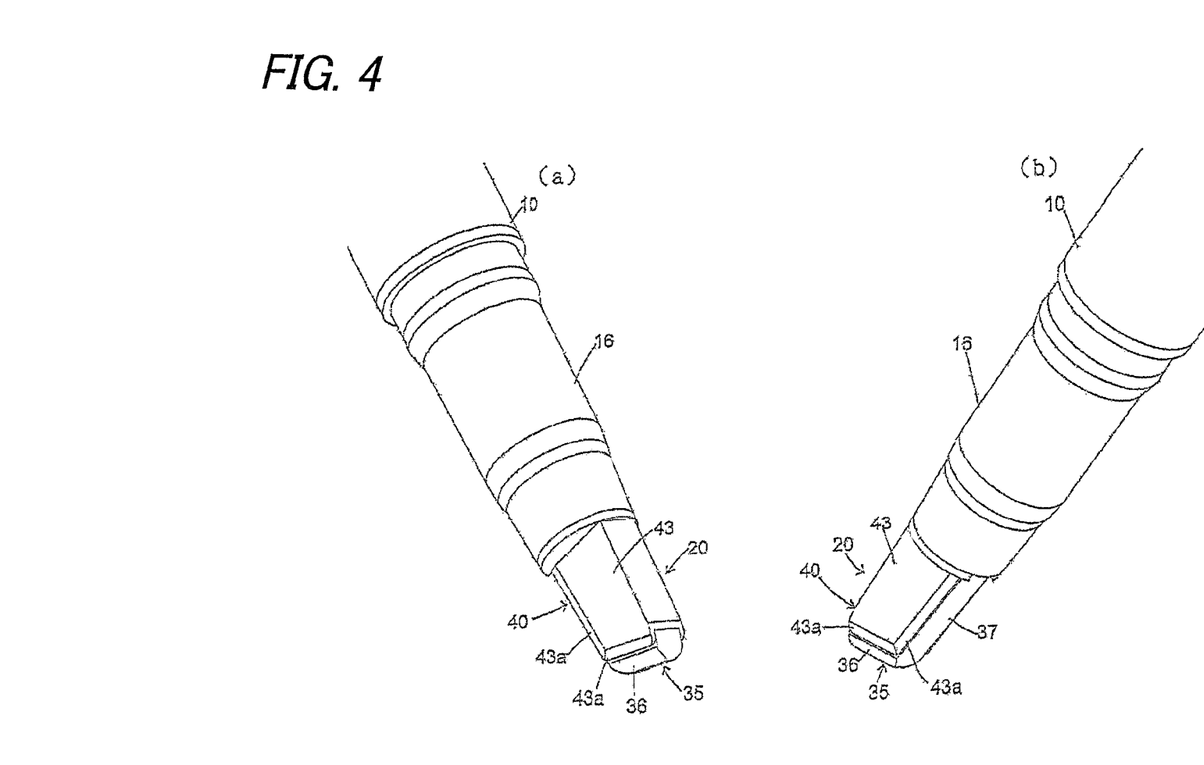
FIG. 4 is enlarged perspective views of a pen tip of the writing instrument of FIG. 3; (a) is an enlarged perspective view of the pen tip as seen from one direction, and (b) is an enlarged perspective view of the pen tip as seen from a direction rotated by 180° with respect to that in (a).

Writing Instrument of Second Embodiment: Overall Configuration: FIGS. 3 and 4

As illustrated in FIG. 3, the writing instrument of the present second embodiment is a writing instrument B including at least:
a barrel 10 in which an aqueous ink is contained through an ink absorber 15;
a pen tip 20 provided on a tip side of the barrel 10 and capable of discharging the aqueous ink; and
a cap 60 that is removably attached on the pen tip 20 side of the barrel 10, the cap 60 being formed of a material having transparency, wherein
the aqueous ink has a vapor pressure of 10.3 to 12.3 kPa at 50° C. in the same manner as in the first embodiment.

The aqueous ink used in the second embodiment is the aqueous ink having the vapor pressure characteristics described in detail in the first embodiment, and thus description thereof will be omitted.

Specific Configuration of Writing Instrument of Second Embodiment

FIG. 3(a) is a plan view of the writing instrument equipped with a cap of the present second embodiment, FIG. 3(b) is a front view thereof, and FIG. 3(c) is a vertical cross-sectional view thereof as seen from the front. FIG. 4 is enlarged perspective views of the pen tip of the writing instrument of FIG. 1; (a) is an enlarged perspective view of the pen tip as seen from one direction, and (b) is an enlarged perspective view of the pen tip as seen from a direction rotated by 180° with respect to that in (a).

As illustrated in FIG. 3, the writing instrument of the present embodiment is the writing instrument B including at least:
the barrel 10 in which an aqueous ink having the aforementioned blending composition is contained in an ink absorber 15;
the pen tip 20 provided on the tip side of the barrel 10 and capable of discharging the aqueous ink; and
the cap 60 that is removably attached on the pen tip 20 side of the barrel 10, the cap 60 being formed of a material having transparency or a material having no transparency, wherein
the aqueous ink is the aqueous ink having the vapor pressure characteristics described in detail in the first embodiment.

In the case where the writing instrument B has the same configuration and function as those of the writing instrument A of the first embodiment, the same reference numerals will be given to the drawings in the second embodiment below, and description thereof will be omitted.

In the writing instrument B of the second embodiment, the writing core 30 of the embodiment having a U-shaped outer shape is used, but the second embodiment is different in that a writing core 35 having an L-shaped outer shape is attached to a holding body 40 as illustrated in FIGS. 3 and 4.

A writing portion 36 of the writing core 35 of the second embodiment has a shape similar to that of the writing portion of the above embodiment and has an inclined shape (knife-cut shape) to be inclined to facilitate writing. In the writing core 35, a thin plate body 37 is integrally provided continuously from the end side of the writing portion 36 and has an L-shaped outer shape, and a cross section of the thin plate body 37 has a rectangular shape.

As illustrated in FIG. 4, the holding body 40 fixes the writing portion 36 and the thin plate body 37 of the writing core 35 and is fixed to a tip opening of a front barrel 16 of a writing instrument main body 10. In the embodiment of FIG. 1 above, the holding body 40 forms the attachment surfaces for attaching the thin plate bodies 31, 31 on the upper and lower sides, but in the present embodiment, the outer shape is in L-shape, and thus the holding body 40 attaches the thin plate body 37 only on the lower side.

For the writing instrument B of the present second embodiment, in the case of using the cap 60 formed of a material having transparency and having a large internal volume to show the pen tip 20, even when the writing instrument is mistakenly placed in an environment with temperature change or temperature gradient, for example, a place exposed to direct sunlight, a place near a heating vent, a place near a heat source such as a PC, or on an electric carpet, the use of the aqueous ink having a vapor pressure of 10.3 to 12.3 kPa at 50° C. eliminates the occurrence of condensation in the cap 60 and does not impair the appearance. This also allows visual recognition of the shape of the pen tips 20 and 50 and the color tone of the aqueous ink (e.g., an ink color of yellow or pink) through the caps 60 and 70 and thus provides the writing instrument with high writing instrument quality and high commercial value (this point will be further described in detail in Examples below).

In the writing instrument B of this second embodiment, the writing core 35 has an L-shaped outer shape and thus is configured not to attach the thin plate body 31 on the upper surface side of the visible portion 43 as compared with the writing core having the U-shaped outer shape of FIG. 1, and thus has nothing to block, allowing enlargement of the area of the visible portion correspondingly. Furthermore, the portion in contact with the side surface of the holding body 40 of the writing core 35 has a rectangular cross-sectional shape, which can increase the width of the visible portion 43 on the bottom surface side relative to the cross-sectional area. Moreover, the outer peripheral edges of the visible portion 43 of the holding body 40 are formed as the inclined refracting surfaces 43a, 43a, which allows the rectangular cross section to look thin and allows the area of the visible portion 43 to look larger than that of FIG. 1.

The pen tip 20 of the second embodiment is attached in the same manner as in the writing instrument of FIG. 1 and has the visible portion (window portion) 43 through which the writing direction is visible, and the aqueous ink in the ink absorber 15 reaches the writing portion 36 by the capillary force of the writing core 35 and is used for writing. At the time of writing, looking at the visible side through the visible portion (window portion) 43 facilitates easy adjustment of the starting position of drawing and makes it possible to stop drawing exactly at a desired part of the end of drawing and to prevent excessive drawing and to prevent the drawing from extending off.

In the second embodiment, the pen tip 20 guides the aqueous ink from the ink absorber 15 to the writing portion 36 through the thin plate body 37 of the writing core 35, the thin plate body 37 having a thickness smaller than that of the writing portion 36 and outflow properties. In addition, this thin plate body 37 is formed of a material having even better ink supply capability than that of the embodiment of FIG. 1 above and thus has good ink outflow properties and need not be designed to be thick and does not interfere with the visible portion 43. Moreover, the portions in contact with the side surfaces of the holding body 40 of the writing core 35 have a rectangular cross-sectional shape, which can increase the width of the visible portion 43 relative to the cross-sectional area. In addition, the outer peripheral edges of the visible portion 43 of the holding body 40 are formed as the inclined refracting surfaces 43a, 43a, which allows the rectangular cross section to look thin. Thus, for example, in the case of writing with a right hand from left to right direction, a line can be drawn with the writing portion 36 while the writing direction is visually recognized through the visible portion 43. Furthermore, together with the maximization of the effective area of the visible portion relative to the entire pen tip, the thin plate body 37 having the above characteristics efficiently supplies the ink to the integrally formed writing portion 36, thus achieving good ink out flow properties and providing the writing instrument with the ability to achieve maximization of the effective area of the visible portion 43 better than the embodiment of FIG. 1 without impairing the ink outflow properties.

In the same manner as in the first embodiment, the inner surfaces 61 and 71 of the caps 60 and 70 may be subjected to a hydrophilization treatment.

Figure 5:
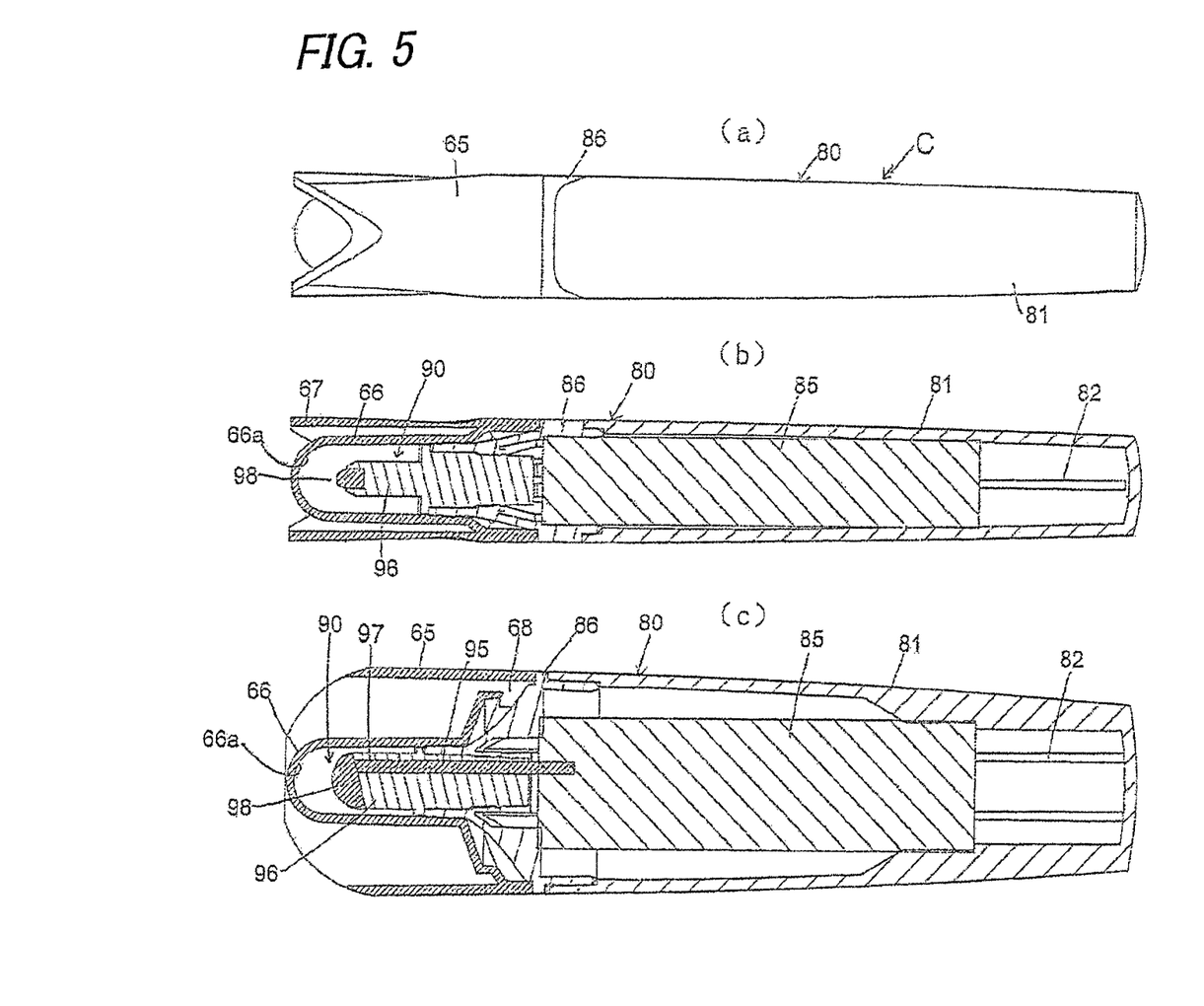
FIG. 5 is views illustrating another embodiment (third embodiment) of the writing instrument of the present invention equipped with a cap; (a) is a front view, (b) is a central vertical cross-sectional view, and (c) is a central transverse cross-sectional view.
Figure 6:
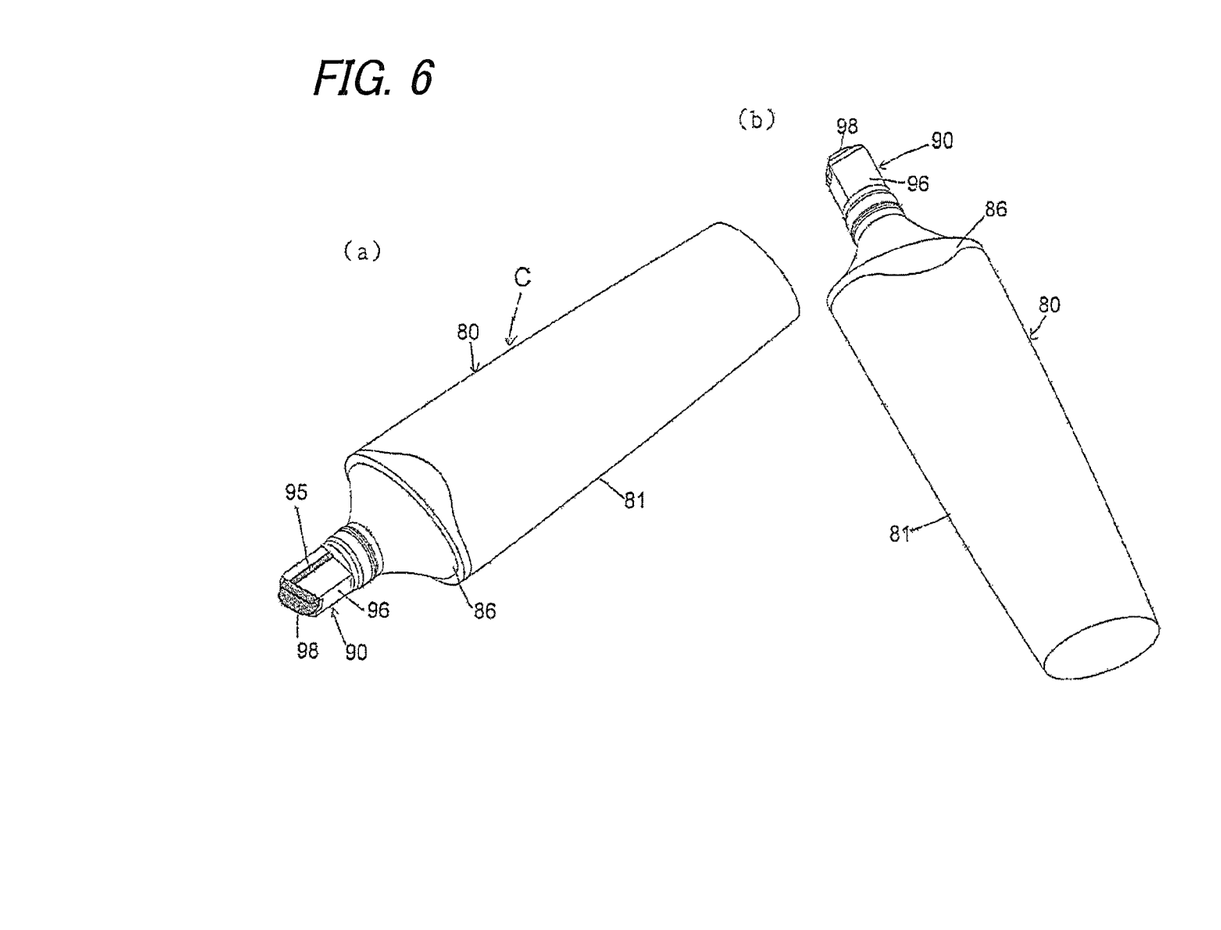
FIG. 6(a) is a view illustrating an example of a state where the cap of the writing instrument of FIG. 5 is removed and is a perspective view as seen from the front side in the case where a holding body has visibility.
FIG. 6(b) is a view illustrating another example of a state where the cap of the writing instrument of FIG. 5 is removed and is a perspective view as seen from the rear side in the case where a holding body has no visibility.

Writing Instrument of Third Embodiment: Overall Configuration: FIGS. 5 and 6

A writing instrument C of the third embodiment is a marking pen-type writing instrument, and the writing instrument C includes at least:
  a barrel 80 in which an aqueous ink is contained;
  a pen tip 90 provided on a tip side of the barrel 80 and capable of discharging the aqueous ink; and
  a cap 65 that is removably attached on the pen tip 90 side of the barrel 80, the cap 65 being formed of a material having transparency, wherein
  the aqueous ink is the aqueous ink having a vapor pressure of 10.3 to 12.3 kPa at 50° C. of the first embodiment.

The aqueous ink used in the third embodiment is the aqueous ink having the vapor pressure characteristics described in detail in the first embodiment, and thus description thereof will be omitted.

As illustrated in FIGS. 5 and 6, the writing instrument C of the third embodiment includes the barrel 80 constituting a writing instrument main body, an ink absorber 85, an ink guide core 95, the pen tip 90, and the cap 65.

The barrel 80 is formed of a material similar to that of the barrel 10 of the first embodiment and has a bottomed cylindrical rear barrel 81 for containing the ink absorber 85 impregnated with the aqueous ink having the above characteristics, and a front barrel 86 for fixing the pen tip 90.

The rear barrel 81 is formed by, for example, molding a synthetic resin containing PP into a long bottomed elliptic cylindrical shape, and functions as a main body (barrel) of the writing instrument. As illustrated in FIGS. 5(a) to (c), the rear barrel 81 is provided with a holding member 82 formed of a holding piece for holding the rear end portion of the ink absorber 85 inside the rear end side, and the entire rear barrel and the front barrel described below are molded to be opaque or transparent (and translucent), but either may be adopted from the viewpoint of appearance and practicality. The rear barrel 81 is configured to fix the front barrel 86 to an opening on the pen tip side of the rear barrel 81 by fitting.

The ink absorber 85 is formed of a material similar to that of the ink absorber 15 of the first embodiment.

The ink guide core 95 for the aqueous ink in the ink absorber 85 is inserted and fixed in an insertion-fixation hole 97 formed in a holding body 96 described below and, similarly to the ink absorbers 15 and 85, has a fiber bundle, a fiber bundle core obtained by processing a fiber bundle, such as felt, or a hard sponge, a resin particle porous body formed of a resin particle sintered body, or a core having continuous pores (flow paths), such as a sliver core. The shape and structure of the ink guide core 95 is not particularly limited as long as the aqueous ink having the vapor pressure characteristics or blending characteristics described above impregnated in the ink absorber 85 can be supplied through the ink guide core 95 to a pen core 98 serving as the writing portion of the pen tip 90. Examples of the cross-sectional shape of the ink guide core 95 include a circle, an ellipse, a square, a rectangle, a trapezoid, a parallelogram, a rhombus, a semicylindrical shape, and a half-moon shape. In the present embodiment, the cross-sectional shape is a circular shape.

The pen tip 90 includes:
  the pen core 98 serving as the writing portion, and
  the holding body 96 holding the pen core 98 and having the ink guide core 95 for supplying the ink to the writing portion.

The entire pen tip 90 or the holding body 96 thus configured is formed of a material providing visibility, for example, a material such as PP, PE, PET, PEN, nylon (including amorphous nylon in addition to common nylon, such as 6 nylon or 12 nylon), acrylic resin, polymethylpentene, polystyrene, and ABS, and is preferably formed of a material having a visible light transmittance of 50% or more.

The entire pen tip 90 or the holding body 96 can be formed by using one type of the above materials, or from the viewpoint of further improvement in durability and visibility, using two or more types of materials. In the case where the entire pen tip 90 or the holding body 96 is formed of two or more types of materials, at least one of them is preferably formed of a material having a visible light transmittance of 50% or more. The entire pen tip 90 or the holding body 96 can be formed by any molding method, such as injection molding or blow molding.

FIG. 6(a) illustrates an example of a state where the cap is removed from the writing instrument C of the present embodiment, and is a view illustrating the holding body 96 formed of a material providing visibility. FIG. 6(b) is a view illustrating the holding body 96 formed of a material providing no visibility.

The writing instrument C of the present embodiment can be easily manufactured by holding the ink absorber 85 containing the ink and the ink guide core 95 in the rear barrel 81 constituting the barrel of the writing instrument, and sequentially attaching the pen tip 90 equipped with the pen core 98, and the front barrel 86 by fitting or a like process.

The cap 65 is removably attached to the front barrel 86 by fitting, and includes an inner cap portion 66 for protecting the pen core 98 and a cylindrical outer cap portion 67. A cap vent hole 68 for preventing accidental swallowing is formed at a joint between the inner cap portion 66 and the outer cap portion 67. Furthermore, the inner cap portion 66 is configured to be able to prevent agglomeration of water droplets inside the inner cap portion 66 by subjecting an inner surface 66a to the hydrophilization treatment described above and providing the inner cap portion 66 with a curved surface.

Similar to the cap of the first embodiment, the cap 65 is formed by molding of a material having transparency (material providing visibility) and having a visible light transmittance of 50% or more, and thus the pen tip 90 can be seen (visible) from the outside through the cap 65.

Similar to the first embodiment and the second embodiment, the thus-configured writing instrument C of the present embodiment eliminates the occurrence of condensation in the cap 65 and does not impair the appearance. In addition, the shape of the pen tip 90 and the color tone of the aqueous ink (e.g., an ink color of yellow or pink) is visible through the cap 65. Thus, the writing instrument is provided with high writing instrument quality and high commercial value.

In addition, the aqueous ink having the above characteristics can be more continuously and efficiently supplied from the ink absorber 85 to the ink guide core 95 and the pen core 98 by capillary force action. This provides the writing instrument with the ability to ensure an appropriate ink flow rate for prevention of blur in writing, to stabilize the writing flow rate, and to sufficiently use up the aqueous ink in the ink absorber 85.

Furthermore, as described above, the pen tip 90 includes the pen core 98 serving as the writing portion, and the holding body 96 holding the pen core 98 and having at least one ink guide core 95 for supplying the ink to the writing portion. The pen tip 90 supplies the aqueous ink contained in the ink absorber 85 through the ink guide core 95 provided in the holding body 96, and the holding body 96 is formed of a material providing visibility as illustrated in FIG. 6(a). Thus, the entire surface (entirety) of the holding body 96, except for the ink guide core 95, serves as the visible portion through which the writing direction is visible. The area ratio of the visible portion can be adjusted to 40% or more relative to the pen tip protruding from the front barrel 86 tip portion. Preferably, the area ratio of the visible portion on the holding body 96 side surfaces is also adjusted to 40% or more, and the ink guide core 95 is formed at the central part in the longitudinal direction of the holding body 96, and the lateral length, the diameter, and the cross-sectional area of the ink guide core 95 are suitably set to preferred given ranges. This can provide sufficient visibility that allows letters and characters written in the writing direction to be more reliably read as compared with the case of the related art, and provides the writing instrument with the ability to be used until the end of writing.

In the present embodiment, the pen core 98 has a convex curved surface and is configured to allow stable writing with little change in thickness even if the writing angle is not stable. The ink guide core 95 is inserted into the insertion-fixation hole 97 of the holding body 96 and is not disposed in the central part of the holding body 96 or is disposed outside the central part of the holding body 96 (the insertion-fixation hole 97 is eccentrically disposed). This can make the visible area look wider in the case where the holding body 96 has transparency (visibility). FIG. 6(b) is a view illustrating the holding body 96 formed of a material providing no visibility. In this configuration, the ink guide core 95 is invisible.

The writing instruments A to C of the embodiments described above correspond to a type in which the aqueous ink having the vapor pressure characteristics of the first embodiment is absorbed in the ink absorber 15 or 85. However, as long as the writing instrument is equipped with a cap that is removably attached on the pen tip side of the barrel and is formed of a material having transparency (material providing visibility) or a material having no transparency (material providing no visibility), the writing instrument may be a direct liquid-type writing instrument, for example, a collector-type writing instrument in which the aqueous ink having the vapor pressure characteristics used in the present invention is directly contained in the barrel and the aqueous ink is supplied through a relay core to the writing portion of the pen tip.

In each of the writing instruments A to C of the embodiments described above, the pen tip 20 or 90 has a window portion through which the writing direction is visible. However, the shape and structure of the pen tip are not particularly limited as long as the writing instrument is equipped with a cap that is removably attached on the pen tip side of the barrel and is formed of a material having transparency (material providing visibility) or a material having no transparency (material providing no visibility).

EXAMPLES

Examples 1 to 10 and Comparative Examples 1 and 2

Each aqueous ink composition for a writing instrument was prepared by an ordinary method according to the blending formulation shown in Table 1 below.

In addition, the resulting aqueous ink composition for a writing instrument was loaded into a writing instrument having the configuration described below. The resulting writing instrument was evaluated for the presence or absence of condensation and writing performance by the evaluation methods described below. These results are shown in Table 1 below.

Configuration of Writing Instrument

A pen tip and a writing instrument in accordance with the configuration below and FIGS. 1 and 2 were used. The below-described dimensions and physical properties the pen tip and the holding body were used.

Configuration of Pen Tip 20

Made of an acrylic resin, visible light transmittance of 85% [the reflectance was measured with a multiple light source spectrocolorimeter (MSC-5N) available from Suga Test Instruments Co., Ltd. and used as visible light transmittance.]

Size of visible portion (window portion) 43 (quadrangle): 10 mm×8 mm×5 mm×5 mm
Width of visible portion: 3 mm
Writing core 30: configuration of thin plate bodies 31, 31: polyethylene-made sintered core, lateral length: 2 mm, longitudinal length: 20 mm, thickness: 0.5 mm, writing portion 25: polyethylene-made sintered core, porosity: 50%, 4×3×6 mm, thickness=3 mm, longitudinal length=5 mm
Ink absorber 15: PET fiber bundle, porosity 858, 06×80 mm Writing instrument main body 10, caps 60 and 70: made of polypropylene (PP)
Pen tip 50: polyester-made fiber bundle core, porosity 60%, ¢2×40 mm
Cap 60: made of polypropylene (PP), transmittance: 70%
Cap 70: made of polypropylene (PP), transmittance: 60%

Method for Evaluating Presence or Absence of Condensation

The resulting writing instrument was used and allowed to stand on a hot carpet for 9 hours, and the presence or absence of condensation in the caps 60 and 70 was evaluated according to the following evaluation criteria.

Evaluation Criteria
A: No condensation.
B: Slightly cloudy.
C: Mostly cloudy.
D: Generation of droplets.
E: Accumulation of liquid.

Method for Evaluating Writing Performance

Straight lines of 25 cm were drawn on PPC paper using the resulting writing instrument, and the writing performance was evaluated according to the following evaluation criteria.

Evaluation Criteria
A: No abnormality in drawn lines.
B: Partially faint, but no abnormality in most drawn lines.
E: Almost blurred.

TABLE 1

(Total amount 100 mass %)

|  |  | Comparative Example | Example | | | | | | | |
|---|---|---|---|---|---|---|---|---|---|---|
|  |  | 1 | 1 | 2 | 3 | 4 | 5 | 6 | 7 | 8 |
| Colorant | Colored resin fine particle dispersion *1 | 40 | 40 | 40 | 40 | 40 | 40 | 40 | 40 | 40 |
| Glycol | Glycerin | 45 | 40 | 35 | 30 | 25 | 20 | 15 | 10 | 5 |
| Water-soluble betaine | Trimethylglycine | 3 | 3 | 3 | 3 | 3 | 3 | 3 | 3 | 3 |
| Water | Purified water | 12 | 17 | 22 | 27 | 32 | 37 | 42 | 47 | 52 |
| Converted water amount (total) |  | 37 | 42 | 47 | 52 | 57 | 62 | 67 | 72 | 77 |
| Vapor pressure at 50° C. (static method: kPa) |  | 10.0 | 10.4 | 10.8 | 11.1 | 11.4 | 11.7 | 11.9 | 12.1 | 12.3 |
| Hydrophilization treatment on cap inner surface |  | No | No | No | Ne | No | No | No | No | No |
| Evaluation | Presence or absence of condensation | A | A | A | A | B | B | B | C | D |
|  | Writing performance | E | A | A | A | A | A | A | A | A |

|  |  | Comparative Example | Example | | | | |
|---|---|---|---|---|---|---|---|
|  |  | 2 | 9 | 10 | 11 | 12 |
| Colorant | Colored resin fine particle dispersion *1 | 40 | 40 | 40 | 40 | 40 |
| Glycol | Glycerin | 0 | 35 | 30 | 5 | 0 |
| Water-soluble betaine | Trimethylglycine | 0 | 0 | 0 | 3 | 0 |
| Water | Purified water | 60 | 25 | 30 | 52 | 60 |
| Converted water amount (total) |  | 85 | 50 | 55 | 77 | 85 |
| Vapor pressure at 50° C. (static method: kPa) |  | 12.5 | 10.9 | 11.2 | 12.3 | 12.5 |
| Hydrophilization treatment on cap inner surface |  | No | No | No | Yes | Yes |
| Evaluation | Presence or absence of condensation | E | B | B | A | B |

TABLE 1-continued (Total amount 100 mass %)

| Writing performance | E | A | A | A | B |
|---|---|---|---|---|---|

*1: Colored resin fine particle dispersion containing an oil dye content ratio 37.5%, average particle size: 0.7 μm)
(Oil-soluble dye: Savinyl Blue GLS (available from Clariant AG), resin type: (meth)acrylic acid, solid content:water content = 15:25, solid content ratio 37.5%, average particle size: 0.7 μm)

As is evident from the results in Table 1, as compared with Comparative Examples 1 and 2, which fall outside the scope of the present invention, in each of the writing instruments of Examples 1 to 10, which fall within the scope of the present invention and are loaded with the aqueous ink composition for a writing instrument, writing performance is not impaired, condensation does not occur in the cap, and appearance is not impaired even though the writing instrument is equipped with the cap formed of a material having transparency. The results also demonstrated that the shape of the pen tip and the color tone of the aqueous ink is visible through the cap having transparency, and thus the writing instrument is provided with high writing instrument quality and commercial value.

Each of the writing instruments of Examples 1 to 10 corresponds to that illustrated in FIGS. 1 and 2. The ink from the ink absorber 15 is guided to the writing portion 25 through thin plate bodies 31, 31 having a thickness smaller than that of the writing portion 25 and outflow properties. In addition, the writing core 30 having the U-shaped outer shape and including the writing portion 25 and the thin plate bodies 31, 31 is formed of the polyethylene sintered core having the above configuration and thus has increased strength of the capillary force relative to the porosity, and its thickness can be extremely reduced. The writing core 30 had good ink outflow properties, eliminating the need for designing the ink guide portion to be thick and not interfering with the visible portion 43. Moreover, the portions in contact with the side surfaces of the holding body 40 of the writing core 30 have a rectangular cross-sectional shape, which can increase the width of the visible portion 43 relative to the cross-sectional area. In addition, the outer peripheral edges of the visible portion 43 of the holding body 40 are formed as the inclined refracting surfaces 43a, 43a, which allows the rectangular cross section to look thin. Thus, in the case of writing with a right hand from left to right direction, a line can be drawn by the writing portion 25 while the writing direction is visually recognized through the visible portion 43. Furthermore, together with the maximization of the effective area of the visible portion relative to the entire pen tip, the thin plate bodies 31, 31 having the above characteristics efficiently supplies the ink to the integrally formed writing portion 25, thus achieving good ink outflow properties. Thus, the results demonstrated that the writing instrument is provided with the ability to achieve maximization of the effective area of the visible portion 43 without impairing the ink outflow properties. In addition, it was confirmed that writing was possible without blurring even after the writing instrument was dropped from a height of 1 m.

In the writing instruments of Examples 11 and 12, the inner surface of the cap was subjected to a hydrophilization treatment.

In the caps 60 and 70 of the writing instruments used as described, the inner surfaces of the caps 60 and 70 were subjected to a hydrophilization treatment by the following method.

Hydrophilization Treatment Method

The inner surfaces of the caps 60 and 70 were subjected to a hydrophilization treatment by application of a polysilicate-based hydrophilic coating agent "NP-235 (available from Daiko Technical Corporation)" and then drying at room temperature (25° C.).

When the presence or absence of condensation was evaluated using this writing instrument with the ink composition of Example 8, the presence or absence of condensation was evaluated as "A", while the presence or absence of condensation with the ink composition of Comparative Example 2 was evaluated as "B", confirming the presence of hydrophilization treatment. In addition, the writing performance was evaluated as "A" in Example 11 and "B" in Example 12.

INDUSTRIAL APPLICABILITY

The writing instrument can be suitably utilized for a pen core-type writing instrument called a felt-tip pen or a marking pen, in which a porous body is mainly used as a writing portion.

REFERENCE SIGNS LIST

10 Barrel
20 Pen tip
25 Writing portion
30 Writing core
40 Holding body
43 Visible portion
60 Cap

The invention claimed is:

1. A writing instrument comprising at least:
a barrel in which an aqueous ink is contained;
a pen tip provided on a tip side of the barrel and capable of discharging the aqueous ink; and
a cap that is removably attached on a pen tip side of the barrel, wherein
the aqueous ink has a vapor pressure of 10.3 to 12.3 kPa at 50° C.

2. The writing instrument according to claim 1, wherein the aqueous ink further contains a water-soluble betaine.

3. The writing instrument according to claim 2, wherein the pen tip has a window portion through which a writing direction is visible.

4. The writing instrument according to claim 1, wherein the pen tip has a window portion through which a writing direction is visible.

5. The writing instrument according to claim 1, wherein an inner surface of the cap is subjected to a hydrophilization treatment.

* * * * *